United States Patent
Abraham

(10) Patent No.: US 8,395,545 B2
(45) Date of Patent: Mar. 12, 2013

(54) METHOD AND SYSTEM FOR UTILIZING REDUCED FUNCTIONALITY PROCESSING CHANNELS IN A GNSS RECEIVER

(75) Inventor: Charles Abraham, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 334 days.

(21) Appl. No.: 12/702,786

(22) Filed: Feb. 9, 2010

(65) Prior Publication Data

US 2011/0193743 A1 Aug. 11, 2011

(51) Int. Cl.
*G01S 19/28* (2010.01)
(52) U.S. Cl. .................................. 342/357.67
(58) Field of Classification Search ............... 342/357.67
See application file for complete search history.

(56) References Cited

U.S. PATENT DOCUMENTS

| | | | | |
|---|---|---|---|---|
| 4,972,431 | A * | 11/1990 | Keegan ............... | 342/357.69 |
| 2003/0114983 | A1 * | 6/2003 | Irvin et al. ............ | 701/214 |
| 2006/0133461 | A1 * | 6/2006 | Sleewaegen .......... | 375/150 |
| 2006/0152409 | A1 * | 7/2006 | Raman et al. ......... | 342/357.15 |
| 2008/0238772 | A1 * | 10/2008 | Soloviev et al. ...... | 342/357.14 |
| 2008/0303714 | A1 * | 12/2008 | Ezal et al. ............. | 342/357.12 |
| 2009/0079627 | A1 * | 3/2009 | Sun et al. .............. | 342/357.12 |
| 2009/0219207 | A1 * | 9/2009 | Shibuya et al. ....... | 342/367 |
| 2011/0156954 | A1 * | 6/2011 | Roh et al. ............. | 342/357.69 |

OTHER PUBLICATIONS

P.C. Ould et al., All-Digital GPS Receiver Mechanization, Navigation: Journal of the Institute of Navigation, vol. 28(3), p. 178-188, Fall 1981.*

* cited by examiner

*Primary Examiner* — Jack W Keith
*Assistant Examiner* — Fred H Mull
(74) *Attorney, Agent, or Firm* — Sterne, Kessler, Goldstein & Fox P.L.L.C.

(57) ABSTRACT

A global navigation satellite system (GNSS) receiver comprising one or more regular channel circuits and one or more sniff channel circuits may be operable, utilizing the sniff channel circuits, to monitor power levels of currently visible GNSS satellites which are not being utilized by the regular channel circuits. An alternative GNSS satellite from the currently monitored GNSS satellites may be selected by the GNSS receiver based on the monitored power levels. GNSS signals received from the selected alternative GNSS satellite may be processed by a regular channel circuit. The GNSS receiver may be operable to detect, for example, signal-to-noise ratios (SNRs) or carrier-to-noise density ratios (C/N0s) of the currently visible GNSS satellites utilizing the sniff channel circuits. The sniff channel circuits may not be utilized to generate GNSS measurements so that functionality of each of the sniff channel circuits may be reduced.

20 Claims, 4 Drawing Sheets

METHOD AND SYSTEM FOR UTILIZING REDUCED FUNCTIONALITY PROCESSING CHANNELS IN A GNSS RECEIVER

CROSS-REFERENCE TO RELATED APPLICATIONS/INCORPORATION BY REFERENCE

[Not applicable]

FIELD OF THE INVENTION

Certain embodiments of the invention relate to communication systems. More specifically, certain embodiments of the invention relate to a method and system for utilizing reduced functionality processing channels in a GNSS receiver.

BACKGROUND OF THE INVENTION

A global navigation satellite system (GNSS) utilizes an earth-orbiting constellation of a plurality of satellites each broadcasting GNSS signals which indicates its precise location and ranging information. From particular locations on or near the earth, GNSS receivers may detect valid GNSS signals and take various GNSS measurements such as pseudorange, carrier phase, and/or Doppler to calculate navigation information or solution such as GNSS receiver position, velocity, and time. The American global positioning system (GPS), the Russian global orbiting navigation satellite system (GLONASS), the European Galileo positioning system and the Chinese Compass navigation system are examples of GNSSs.

A GNSS receiver is often described by its number of channels. In a GNSS receiver, a channel is a path for an electronic signal that is reserved for a specific GNSS satellite and used for various functions. The number of channels in a GNSS receiver signifies how many GNSS satellites the GNSS receiver can monitor simultaneously. Originally limited to four or five, the number of channels in a GNSS receiver has progressively increased over the years so that a GNSS receiver may typically have a large number of channels for processing signals from many GNSS satellites.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for utilizing reduced functionality processing channels in a GNSS receiver, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for utilizing reduced functionality processing channels in a GNSS receiver. In various embodiments of the invention, a global navigation satellite system (GNSS) receiver, which comprises one or more regular channel circuits and one or more sniff channel circuits, may be operable to monitor power levels of currently visible GNSS satellites utilizing one or more of the sniff channel circuits. In this regard, the currently monitored visible GNSS satellites are not being utilized by the regular channel circuits. An alternative GNSS satellite from the currently monitored GNSS satellites that are not being utilized may be selected by the GNSS receiver based on the monitored power levels. GNSS signals received from the selected alternative GNSS satellite may be processed by the GNSS receiver utilizing one of the regular channel circuits. In this regard, the GNSS receiver may be operable to detect, for example, signal-to-noise ratios (SNRs) or carrier-to-noise density ratios (C/N0s) of the currently visible GNSS satellites utilizing the sniff channel circuits. Each of the regular channel circuits may be utilized to generate GNSS measurements for calculating a navigation solution of the GNSS receiver. Each of the regular channel circuits may comprise a plurality of multi-tap correlators and each of the multi-tap correlators may comprise a delay-locked loop (DLL). An early correlator tap, a late correlator tap and the delay-locked loop (DLL) may be utilized by each of the multi-tap correlators to produce a punctual correlator tap during a correlation process.

The sniff channel circuits may not be utilized by the GNSS receiver to generate GNSS measurements so that functionality of each of the sniff channel circuits may be reduced. In other words, the sniff channel circuits do not handle all the channel processing that is handled by the regular channel circuits. The sniff channel circuits only handle a subset of the channel processing that is handled by the regular channel circuits. Each of the sniff channel circuits may comprise a single-tap correlator. A navigation solution of the GNSS receiver may be utilized by the single-tap correlator to produce a punctual correlator tap during a correlation process.

The GNSS receiver may comprise, for example, a global positioning system (GPS) receiver, a global orbiting navigation satellite system (GLONASS) receiver, a Galileo receiver and/or a Compass receiver.

Figure 1:
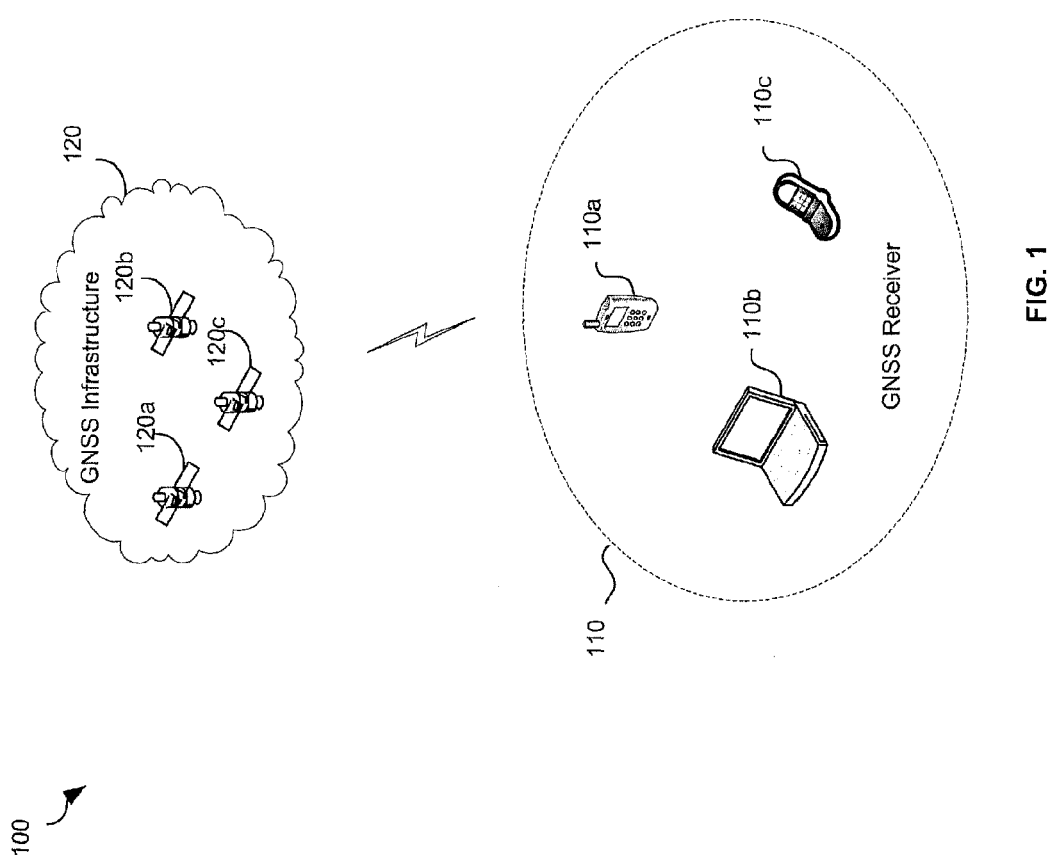
FIG. 1 is a block diagram illustrating an exemplary communication system that is operable to provide utilization of reduced functionality processing channels in a GNSS receiver, in accordance with an embodiment of the invention.

FIG. 1 is a block diagram illustrating an exemplary communication system that is operable to provide utilization of reduced functionality processing channels in a GNSS receiver, in accordance with an embodiment of the invention. Referring to FIG. 1, there is shown a communication system 100. The communication system 100 comprises a plurality of GNSS receivers 110 of which GNSS receivers 110*a*-110*c* are illustrated, and a GNSS infrastructure 120. The GNSS infrastructure 120 comprises a plurality of GNSS satellites such as GNSS satellites 120*a* through 120*c*.

The GNSS receiver such as the GNSS receiver 110a may comprise suitable logic, circuitry, interfaces and/or code that may be operable to receive GNSS broadcast signals from a plurality of visible GNSS satellites such as GNSS satellites 120a through 120c in the GNSS infrastructure 120. The GNSS receiver 110a may comprise, for example, a GPS receiver, a GLONASS receiver, a Galileo receiver and/or a Compass receiver.

The advent of multiple satellite constellations has placed great demand on GNSS receivers 110 to provide a large number of channels for utilizing signals from many GNSS satellites 120. However, it may not be necessary to produce or generate GNSS measurements from all channels. Having so many GNSS measurements could overburden a CPU or baseband processor of the GNSS receiver 110a.

In an exemplary embodiment of the invention, the GNSS receiver 110a may comprise one or more regular channel circuits and one or more sniff channel circuits. The regular channel circuit is a full functionality processing channel circuit while the sniff channel circuit is a simplified and reduced functionality processing channel circuit with respect to the regular channel circuit. The GNSS receiver 110a may be operable to monitor power levels of currently visible GNSS satellites such as, for example, the GNSS satellites 120b, 120c utilizing the sniff channel circuits, while these monitored GNSS satellites 120b, 120c are not being utilized by the regular channel circuits. In this regard, for example, the GNSS receiver 110a may be operable to detect signal-to-noise ratios (SNRs) or carrier-to-noise density ratios (C/N0s) of the currently visible GNSS satellites 120b, 120c utilizing the sniff channel circuits. The SNR is the ratio of the signal power to the noise power as measured in dB. The C/N0 is the ratio of the power level of a signal carrier to the noise power in a 1-Hz bandwidth as measured in dB-Hz. In instances when the GNSS receiver 110a loses lock on a currently utilized GNSS satellite such as, for example, the GNSS satellite 120a, an alternative GNSS satellite from the currently monitored GNSS satellites 120b, 120c may be selected by the GNSS receiver 110a based on the monitored power levels of the currently monitored GNSS satellites 120b, 120c. The selected alternative GNSS satellite such as, for example, the GNSS satellite 120b may be utilized by one of the regular channel circuits for processing. Accordingly, the GNSS receiver 110a may be able to promptly select alternative GNSS satellites to track.

Each of the regular channel circuits may be utilized to generate GNSS measurements for calculating a navigation solution of the GNSS receiver 110a. Each of the sniff channel circuits may not be utilized to generate GNSS measurements so that functionality of each of the sniff channel circuits may be reduced.

The GNSS satellite such as the GNSS satellite 120a may comprise suitable logic, circuitry, interfaces and/or code that may be operable to provide satellite navigational information or data to various GNSS receivers on earth such as, for example, the GNSS receiver 110a through 110c. The GNSS satellite 120a may be operable to broadcast its own ephemeris periodically, for example, once every 30 seconds. The broadcast ephemeris may be utilized to calculate navigation information or solution such as, for example, position, velocity, and clock information of the GNSS receivers 110. The GNSS satellite 120a may be operable to update ephemeris, for example, every two hours. The broadcast ephemeris may be valid for a limited time period such as, for example, 2 to 4 hours into the future from the time of broadcast.

In operation, a GNSS receiver such as the GNSS receiver 110a may be operable to detect and/or receive GNSS signals from, for example, the GNSS satellites 120a-120c. The GNSS receiver 110a may be operable, utilizing the sniff channel circuits, to monitor power levels of the currently visible GNSS satellites 120b, 120c while these GNSS satellites 120b, 120c are not being utilized by the regular channel circuits. An alternative GNSS satellite such as, for example, the GNSS satellite 120b from the currently monitored GNSS satellites 120b, 120c may be selected by the GNSS receiver 110a based on the monitored power levels. The GNSS receiver 110a may be operable to detect, for example, signal-to-noise ratios (SNRs) or carrier-to-noise density ratios (C/N0s) of the currently visible GNSS satellites 120b, 120c utilizing the sniff channel circuits. Each of the regular channel circuits may be utilized to generate GNSS measurements for calculating a navigation solution of the GNSS receiver 110a. Each of the sniff channel circuits may not be utilized to generate GNSS measurements, and as a result, the functionality of each of the sniff channel circuits and the corresponding processing may be reduced.

Figure 2:
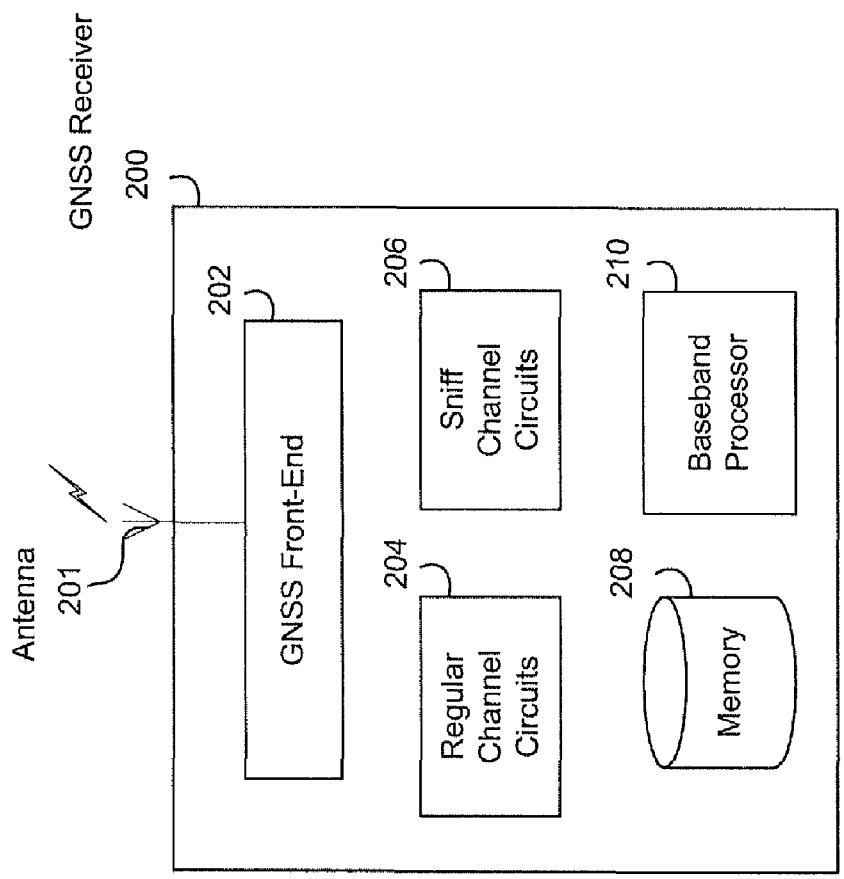
FIG. 2 is a block diagram illustrating an exemplary GNSS receiver that is operable to utilize reduced functionality processing channels, in accordance with an embodiment of the invention.

FIG. 2 is a block diagram illustrating an exemplary GNSS receiver that is operable to utilize reduced functionality processing channels, in accordance with an embodiment of the invention. Referring to FIG. 2, there is shown a GNSS receiver 200. The GNSS receiver 200 may comprise an antenna 201, a GNSS front-end 202, a plurality of regular channel circuits 204, a plurality of sniff channel circuits 206, a memory 208 and a baseband processor 210.

The antenna 201 may comprise suitable logic, circuitry, interfaces and/or code that may be operable to receive GNSS signals from a plurality of visible or available GNSS satellites such as the GNSS satellites 120a through 120c. The antenna 201 may be operable to communicate the received GNSS signals to the GNSS front-end 202 for further processing.

The GNSS front-end 202 may comprise suitable logic, circuitry, interfaces and/or code that may be operable to convert the received GNSS signals to GNSS baseband signals, which may be suitable for further processing in the regular channel circuits 204, the sniff channel circuits 206 and/or the baseband processor 210.

Each of the regular channel circuits 204 may comprise suitable logic, circuitry, interfaces and/or code that may be operable to process or correlate GNSS baseband signals from many GNSS satellites 120. The regular channel circuits 204 are full functionality processing channel circuits. Each of the regular channel circuits 204 may generate GNSS measurements for calculating a navigation solution of the GNSS receiver 200. Each of the regular channel circuits 204 may comprise a plurality of multi-tap correlators and each of the multi-tap correlators may comprise a delay-locked loop (DLL). An early correlator tap, a late correlator tap and the delay-locked loop (DLL) may be utilized by the multi-tap correlators to produce a punctual correlator tap during a correlation process.

Each of the sniff channel circuits 206 may comprise suitable logic, circuitry, interfaces and/or code that may be operable to monitor power levels of currently visible GNSS satellites 120b, 120c. For example, the sniff channel circuits 206 may be operable to detect signal-to-noise ratios (SNRs) or carrier-to-noise density ratios (C/N0s) of the currently visible GNSS satellites 120b, 120c. The sniff channel circuits 206 are simplified and reduced functionality processing channel circuits. Each of the sniff channel circuits 206 may not generate GNSS measurements so that functionality of each of the sniff channel circuits 206 may be reduced. In other words, the sniff channel circuits 206 only handle a subset of the channel processing that is handled by the regular channel circuits 204. Each of the sniff channel circuits 206 may comprise a single-tap correlator. A navigation solution of the GNSS receiver 200 may be utilized by the single-tap correlator to produce a punctual correlator tap during a correlation process.

The memory 208 may comprise suitable logic, circuitry, interfaces and/or code that may be operable to store information such as executable instructions, data and/or database that may be utilized by the regular channel circuits 204, the sniff channel circuits 206 and the baseband processor 210. The memory 208 may comprise RAM, ROM, low latency non-volatile memory such as flash memory and/or other suitable electronic data storage.

The baseband processor 210 may comprise suitable logic, circuitry, interfaces and/or code that may be operable to process GNSS baseband signals from the GNSS front-end 202, the regular channel circuits 204, and/or the sniff channel circuits 206. The baseband processor 210 may be operable to calculate navigation information or solution for various navigation applications.

In an exemplary embodiment of the invention, the baseband processor 210 may be operable to select an alternative GNSS satellite such as, for example, the GNSS satellite 120b from the currently visible GNSS satellites 120b, 120c based on the power levels of the GNSS satellites 120b, 120c which may be monitored and detected by the sniff channel circuits 206.

In operation, the GNSS front-end 202 may be operable to process the received GNSS signals via the antenna 201 and convert into GNSS baseband signals. Each of the regular channel circuits 204 may be operable to process or correlate GNSS baseband signals from many GNSS satellites 120. Each of the regular channel circuits 204 may generate GNSS measurements for calculating a navigation solution of the GNSS receiver 200. Each of the regular channel circuits 204 may comprise a plurality of multi-tap correlators and each of the multi-tap correlators may comprise a delay-locked loop (DLL). An early correlator tap, a late correlator tap and the delay-locked loop (DLL) may be utilized by the multi-tap correlators to produce a punctual correlator tap during a correlation process. Each of the sniff channel circuits 206 may be operable to monitor power levels of currently visible GNSS satellites 120b, 120c such as, for example, the signal-to-noise ratios (SNRs) or the carrier-to-noise density ratios (C/N0s). Each of the sniff channel circuits 206 may comprise one single-tap correlator. A navigation solution of the GNSS receiver 200 may be utilized by the single-tap correlator to produce a punctual correlator tap during a correlation process. The baseband processor 210 may be operable to calculate navigation solution for various navigation applications. The baseband processor 210 may be operable to select an alternative GNSS satellite such as, for example, the GNSS satellite 120b among the currently monitored GNSS satellites 120b, 120c based on the power levels of the GNSS satellites 120b, 120c which may be monitored and detected by the sniff channel circuits 206. The selected alternative GNSS satellite 120b may be utilized by one of the regular channel circuit 204 for processing.

Figure 3:
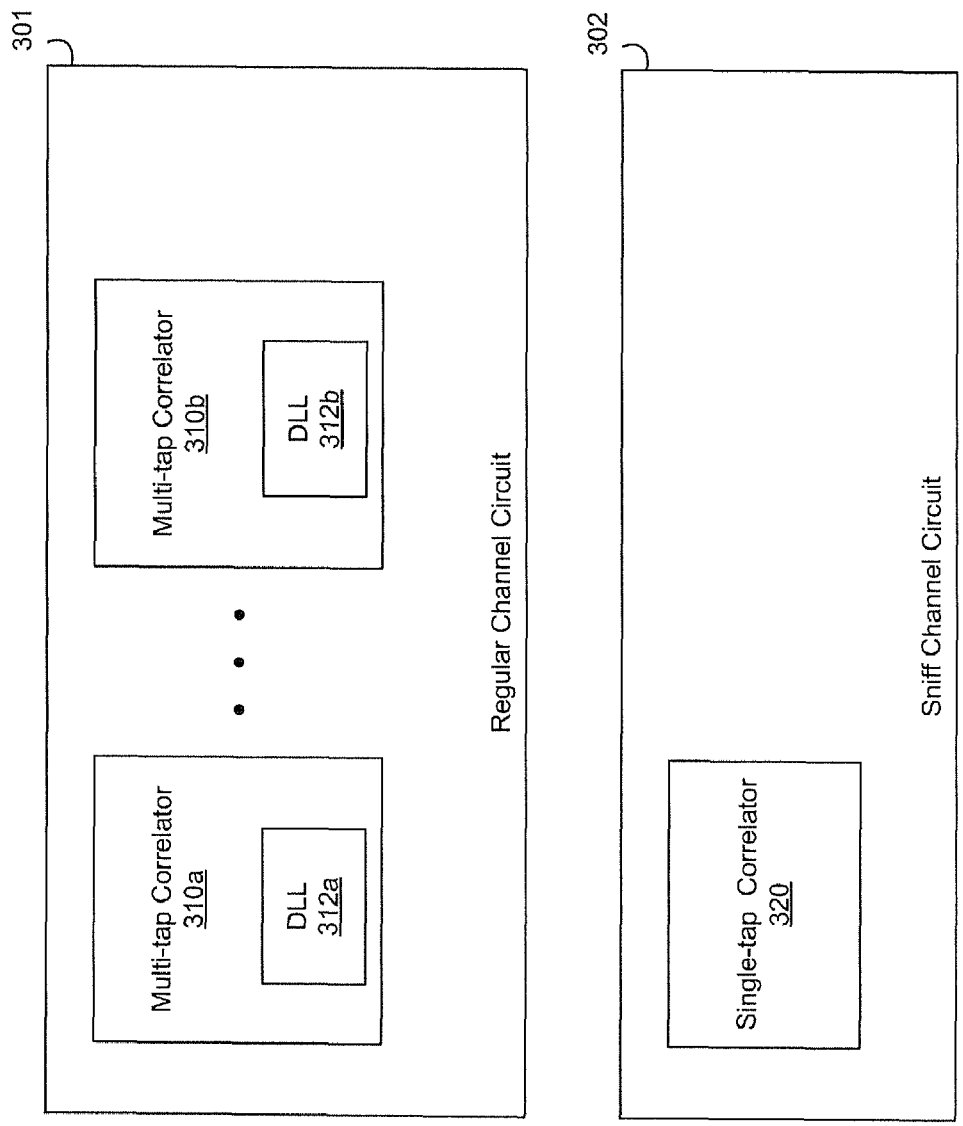
FIG. 3 is a block diagram illustrating an exemplary regular channel and an exemplary sniff channel of the GNSS receiver, in accordance with an embodiment of the invention.

FIG. 3 is a block diagram illustrating an exemplary regular channel circuit and an exemplary sniff channel circuit of the GNSS receiver, in accordance with an embodiment of the invention. Referring to FIG. 3, there is shown a regular channel circuit 301 and a sniff channel circuit 302. The regular channel circuit 301, which is a full functionality processing channel circuit, may comprise a plurality of multi-tap correlators 301a, 301b for searching for satellite signals in time. Each of the multi-tap correlators 301a, 301b may comprise a DLL such as the DLL 312a or the DLL 312b. The sniff channel circuit 302, which is a simplified and reduced functionality processing channel circuit with respect to the regular channel circuit 301, may comprise a single-tap correlator 320.

The multi-tap correlator such as the multi-tap correlator 310a may comprise suitable logic, circuitry, interfaces and/or code that may be operable to perform correlation function of the regular channel circuit 301 for generating GNSS measurements. The multi-tap correlator 310a may employ the DLL 312a and utilize an early correlator tap and a late correlator tap to drive the DLL 312a for producing a punctual correlator tap. The produced punctual correlator tap may be used to lock and/or track a visible GNSS satellite such as, for example, the GNSS satellite 120a for generating GNSS measurements.

The single-tap correlator 320 may comprise suitable logic, circuitry, interfaces and/or code that may be operable to perform correlation function of the sniff channel circuit 302 for monitoring or detecting power levels of available GNSS satellites 120. The single-tap correlator 320 does not employ a DLL. Instead, the timing location of the single punctual correlator tap is guided by a navigation solution of the GNSS receiver 110a. The navigation solution provides information such as current position of the GNSS receiver 110a, GNSS time, satellite orbit data (ephemeris) and satellite clock data. Accordingly, the time delay at which a punctual signal should be centered may be calculated from the navigation solution and the punctual correlator tap may be placed at the right timing location. In an exemplary embodiment of the invention, only one single-tap correlator 320 may be utilized for each sniff channel circuit 302 since knowledge of the location of the satellite signals can be determined or derived based on the navigation solution. Accordingly, for each of the sniff channel circuits 302, there is no need to search for satellite signals as with the regular channel circuits 301.

In operation, the regular channel circuit 301 may comprise a plurality of multi-tap correlators 310a, 310b. The multi-tap correlator 310a may be operable to perform correlation function of the regular channel circuit 301 for generating GNSS measurements. The multi-tap correlator 310a may employ the DLL 312a and utilize an early correlator tap and a late correlator tap to drive the DLL 312a for producing a punctual correlator tap. The produced punctual correlator tap may be used to lock and/or track a visible GNSS satellite 120a for generating GNSS measurements.

The sniff channel circuit 302 may comprise a single-tap correlator 320. The single-tap correlator 320 may be operable to correlate GNSS signals for the sniff channel circuit 302 to enable monitoring and/or detecting power levels of available GNSS satellites 120. The single-tap correlator 320 does not employ a DLL. A navigation solution of the GNSS receiver 110a, which provides information such as current position of the GNSS receiver 110a, GNSS time, satellite orbit data (ephemeris) and satellite clock data, may be utilized by the single-tap correlator 320 to produce a single punctual correlator tap. The timing location of the punctual correlator tap may be guided by the navigation solution of the GNSS receiver 110a. The time delay at which a punctual signal should be centered may be calculated from the navigation solution and the punctual correlator tap may be placed at the right timing location.

Figure 4:
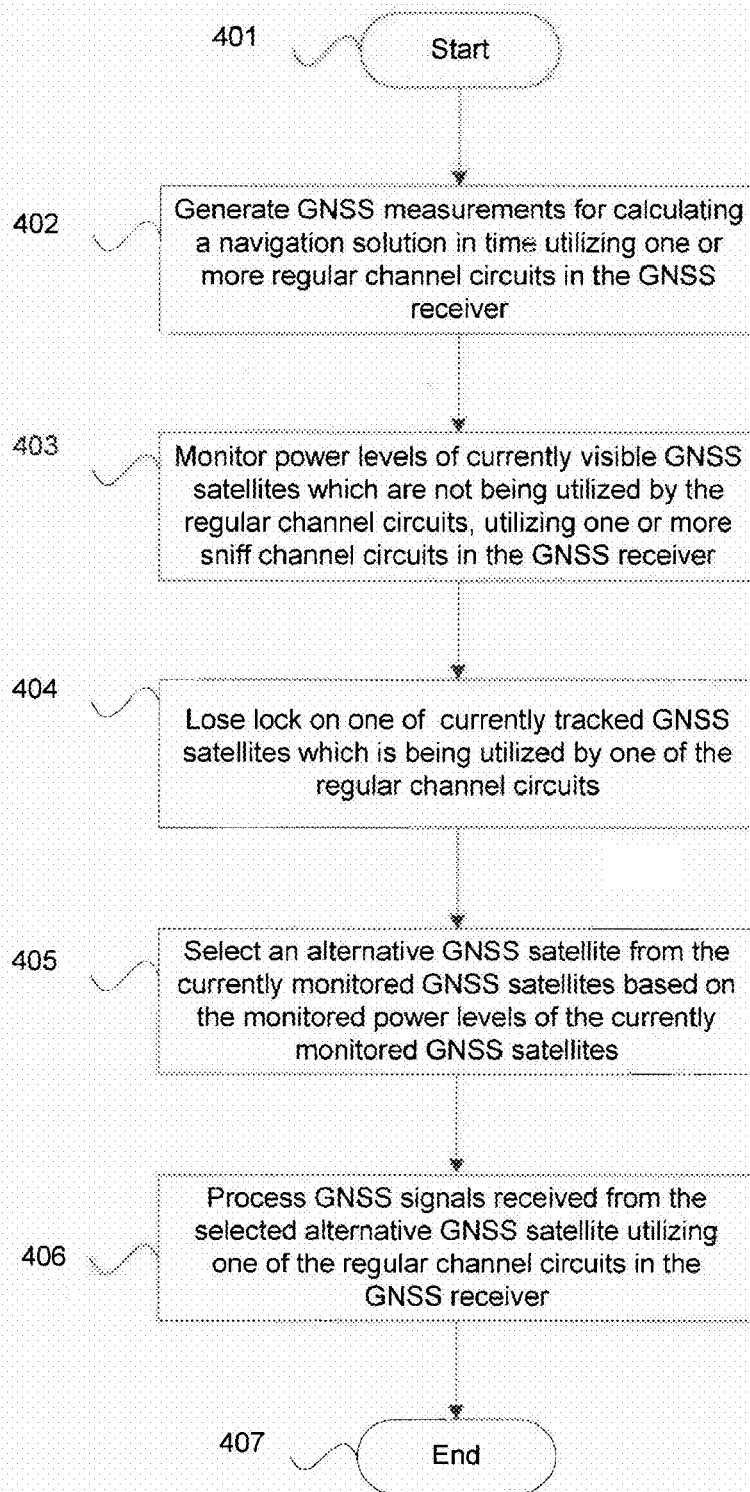
FIG. 4 is a flow chart illustrating exemplary steps for utilizing reduced functionality processing channels in a GNSS receiver, in accordance with an embodiment of the invention.

FIG. 4 is a flow chart illustrating exemplary steps for utilizing reduced functionality processing channels in a GNSS receiver, in accordance with an embodiment of the invention. Referring to FIG. 4, the exemplary steps start at step 401. In step 402, one or more regular channel circuits 204 in the GNSS receiver 200 may be utilized to generate GNSS measurements for calculating a navigation solution in time. In step 403, one or more sniff channel circuits 206 in the GNSS receiver 200 may be utilized to monitor power levels of currently visible GNSS satellites 120b, 120c which are not being utilized by the regular channel circuits 204. In step 404, the GNSS receiver 200 may lose lock on one of currently tracked GNSS satellites 120a which is being utilized by one of the regular channel circuits 204. In step 405, the GNSS receiver 200 may be operable to select an alternative GNSS satellite 120b from the currently monitored GNSS satellites 120b, 120c based on the monitored power levels of the currently monitored GNSS satellites 120b, 120c. In step 406, one of the regular channel circuits 204 in the GNSS receiver 200 may be utilized to process GNSS signals received from the selected alternative GNSS satellite 120b. The exemplary steps may proceed to the end step 407.

In various embodiments of the invention, a GNSS receiver 110a, which comprises one or more regular channel circuits 204 and one or more sniff channel circuits 206, may be operable to monitor power levels of currently visible GNSS satellites 120b, 120c utilizing one or more of the sniff channel circuits 206. In this regard, the currently monitored visible GNSS satellites 120b, 120c are not being utilized by the regular channel circuits 204. The GNSS receiver 110a may comprise, for example, a GPS receiver, a GLONASS receiver, a Galileo receiver and/or a Compass receiver. An alternative GNSS satellite 120b from the currently monitored GNSS satellites 120b, 120c may be selected by the GNSS receiver 110a based on the monitored power levels. GNSS signals received from the selected alternative GNSS satellite 120b may be processed by the GNSS receiver 110a utilizing one of the regular channel circuits 204. In this regard, the GNSS receiver 110a may be operable to detect, for example, SNRs or C/N0s of the currently visible GNSS satellites 120b, 120c utilizing the sniff channel circuits 206. Each of the regular channel circuits 204 may be utilized to generate GNSS measurements for calculating a navigation solution of the GNSS receiver 110a. Each of the regular channel circuits 301 may comprise a plurality of multi-tap correlators 310a, 310b and each of the multi-tap correlators 310a, may comprise a DLL 312a. An early correlator tap, a late correlator tap and the DLL 312a may be utilized by the multi-tap correlators 310a to produce a punctual correlator tap during a correlation process.

Each of the sniff channel circuits 206 may not be utilized to generate GNSS measurements so that functionality of each of the sniff channel circuits 206 may be reduced. Each of the sniff channel circuits 302 may comprise a single-tap correlator 320. A navigation solution of the GNSS receiver 110a may be utilized by the single-tap correlator 320 to produce a punctual correlator tap during a correlation process.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for utilizing reduced functionality processing channel in a GNSS receiver.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
performing by one or more processors and/or circuits in a global navigation satellite system (GNSS) receiver, said one or more processors and/or circuits comprising one or more regular channel circuits and one or more sniff channel circuits, wherein the sniff channel circuits have reduced functionality with respect to the regular channel circuits:
monitoring power levels of currently visible GNSS satellites among a plurality of GNSS satellites utilizing said one or more sniff channel circuits, wherein said currently monitored visible GNSS satellites are not being utilized by said one or more regular GNSS channel circuits; and
selecting an alternative GNSS satellite from said currently monitored GNSS satellites that are not being utilized based on said monitored power levels; and
processing GNSS signals received from said selected alternative GNSS satellite utilizing one of said one or more regular channel circuits.

2. The method according to claim 1, comprising detecting signal-to-noise ratios (SNRs) of said currently visible GNSS satellites utilizing said one or more sniff channel circuits.

3. The method according to claim 1, comprising detecting carrier-to-noise density ratios (C/N0s) of said currently visible GNSS satellites utilizing said one or more sniff channel circuits.

4. The method according to claim 1, comprising generating GNSS measurements for calculating a navigation solution of said GNSS receiver utilizing said one or more regular channel circuits.

5. The method according to claim 1, wherein each of said one or more regular channel circuits comprises a plurality of multi-tap correlators, and each of said plurality of multi-tap correlators comprises a delay-locked loop (DLL).

6. The method according to claim 5, wherein each of said plurality of multi-tap correlators produces a punctual correlator tap utilizing an early correlator tap, a late correlator tap and said delay-locked loop (DLL) during a correlation process.

7. The method according to claim 1, wherein said one of more sniff channel circuits are not used to generate GNSS measurements.

8. The method according to claim 1, wherein each of said one or more sniff channel circuits comprise a single-tap correlator.

9. The method according to claim 8, wherein said single-tap correlator produces a punctual correlator tap utilizing a navigation solution of said GNSS receiver during a correlation process.

10. The method according to claim 1, wherein said GNSS receiver comprises one of a global positioning system (GPS) receiver, a global orbiting navigation satellite system (GLONASS) receiver, a Galileo receiver, and a Compass receiver.

11. A system for communication, the system comprising:
one or more processors and/or circuits for use in a global navigation satellite system (GNSS) receiver, wherein said one or more processors and/or circuits comprise one or more regular channel circuits and one or more sniff channel circuits, wherein the sniff channel circuits have reduced functionality with respect to the regular channel circuits, and said one or more processors and/or circuits are configured to:
monitor power levels of currently visible GNSS satellites among a plurality of GNSS satellites utilizing said one or more sniff channel circuits, wherein said currently monitored visible GNSS satellites are not being utilized by said one or more regular GNSS channel circuits; and
select an alternative GNSS satellite from said currently monitored GNSS satellites that are not being utilized based on said monitored power levels; and
process GNSS signals received from said selected alternative GNSS satellite utilizing one of said one or more regular channel circuits.

12. The system according to claim 11, wherein said one or more processors and/or circuits are operable to detect signal-to-noise ratios (SNRs) of said currently visible GNSS satellites utilizing said one or more sniff channel circuits.

13. The system according to claim 11, wherein said one or more processors and/or circuits are operable to detect carrier-to-noise density ratios (C/N0s) of said currently visible GNSS satellites utilizing said one or more sniff channel circuits.

14. The system according to claim 11, wherein said one or more processors and/or circuits are operable to generate GNSS measurements for calculating a navigation solution of said GNSS receiver utilizing said one or more regular channel circuits.

15. The system according to claim 11, wherein each of said one or more regular channel circuits comprises a plurality of multi-tap correlators, and each of said plurality of multi-tap correlators comprises a delay-locked loop (DLL).

16. The system according to claim 15, wherein each of said plurality of multi-tap correlators produces a punctual correlator tap utilizing an early correlator tap, a late correlator tap and said delay-locked loop (DLL) during a correlation process.

17. The system according to claim 11, wherein said one of more sniff channel circuits are not used to generate GNSS measurements.

18. The system according to claim 11, wherein each of said sniff channel circuits comprise a single-tap correlator.

19. The system according to claim 18, wherein said single-tap correlator produces a punctual correlator tap utilizing a navigation solution of said GNSS receiver during a correlation process.

20. The system according to claim 11, wherein said GNSS receiver comprises one of a global positioning system (GPS) receiver, a global orbiting navigation satellite system (GLONASS) receiver, a Galileo receiver, and a Compass receiver.

* * * * *